United States Patent
Goto et al.

(10) Patent No.: US 9,586,296 B2
(45) Date of Patent: Mar. 7, 2017

(54) METHOD AND DEVICE FOR MOUNTING PISTON

(71) Applicant: HONDA MOTOR CO., LTD., Tokyo (JP)

(72) Inventors: Hiroshi Goto, Tochigi (JP); Yoichi Kamiyama, Tochigi (JP); Satoshi Kanbayashi, Tochigi (JP); Hisashi Takahashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/760,796

(22) PCT Filed: Nov. 13, 2013

(86) PCT No.: PCT/JP2013/080697
§ 371 (c)(1),
(2) Date: Jul. 14, 2015

(87) PCT Pub. No.: WO2014/112195
PCT Pub. Date: Jul. 24, 2014

(65) Prior Publication Data
US 2015/0343578 A1 Dec. 3, 2015

(30) Foreign Application Priority Data
Jan. 16, 2013 (JP) .................. 2013-005698
Jul. 17, 2013 (JP) .................. 2013-148320

(51) Int. Cl.
*B23P 19/04* (2006.01)
*F02F 3/00* (2006.01)
*F02F 1/24* (2006.01)

(52) U.S. Cl.
CPC .............. *B23P 19/043* (2013.01); *F02F 1/24* (2013.01); *F02F 3/0015* (2013.01);
(Continued)

(58) Field of Classification Search
CPC ... B23P 19/043; B23P 2700/50; F02F 3/0015; F02F 1/24; Y10T 29/53687; Y10T 29/49233
See application file for complete search history.

(56) References Cited

U.S. PATENT DOCUMENTS 6,886,241 B2 * 5/2005 Tachibana ............. B23P 19/043
29/281.5

FOREIGN PATENT DOCUMENTS

JP    6-226558    8/1994
JP    10-138060   5/1998
(Continued)

OTHER PUBLICATIONS

International Search Report, Date of mailing: Dec. 10, 2013 (Dec. 10, 2013).

*Primary Examiner* — Richard Chang
(74) *Attorney, Agent, or Firm* — Rankin, Hill & Clark LLP

(57) ABSTRACT

A guide rod, which has a diameter expandable tip end portion and restricts the oscillation of a connecting rod and a piston, is inserted into a cylinder bore via an opening adjacent to a crank chamber of the cylinder bore, and the piston is inserted into the cylinder bore via a cylinder head mounting side opening with the connecting rod positioned at a leading end. The diameter of the tip end portion of the guide rod is increased in a hole of a semi-circular arc-shaped end portion positioned at tip end of the connecting rod in the insertion direction, and thus the connecting rod is engaged with the guide rod. The guide rod moves and the connecting rod is pulled into the cylinder bore until the semi-circular arc-shaped end portion of the connecting rod sits on a crankpin of a crankshaft.

5 Claims, 15 Drawing Sheets

(52) U.S. Cl.
  CPC ..... *B23P 2700/50* (2013.01); *Y10T 29/49233* (2015.01); *Y10T 29/53687* (2015.01)

(56) References Cited

FOREIGN PATENT DOCUMENTS

| | | |
|---|---|---|
| JP | 3334519 | 8/2002 |
| JP | 2004-034215 | 2/2004 |
| JP | 2008-049477 | 3/2008 |
| JP | 4213096 | 11/2008 |
| JP | 2009-113129 | 5/2009 |

* cited by examiner

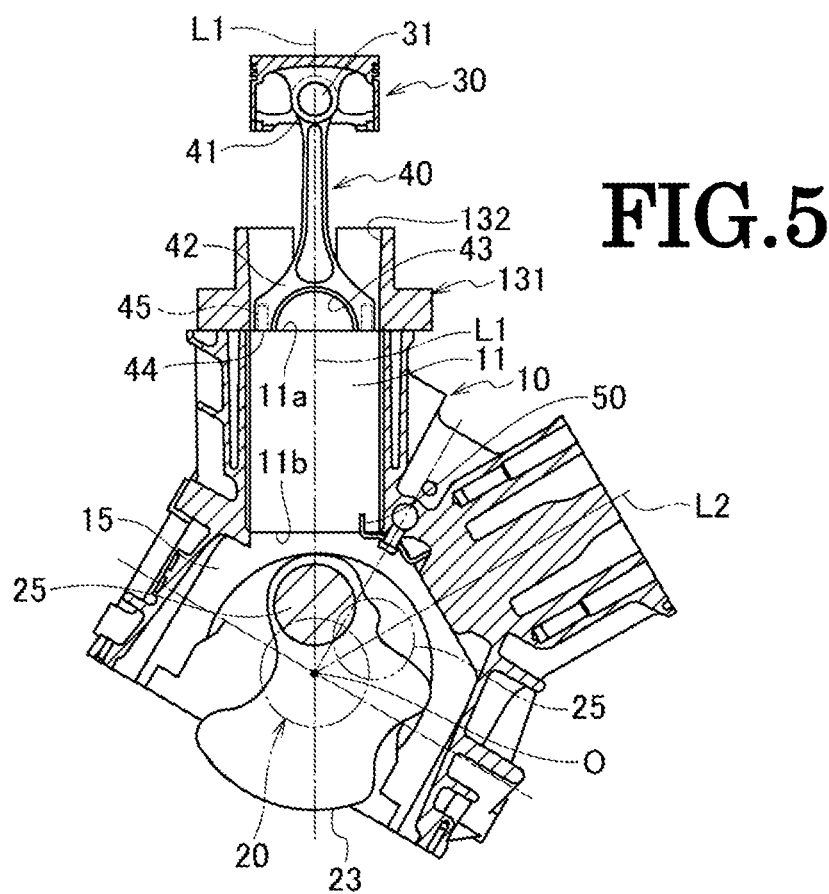
FIG.5
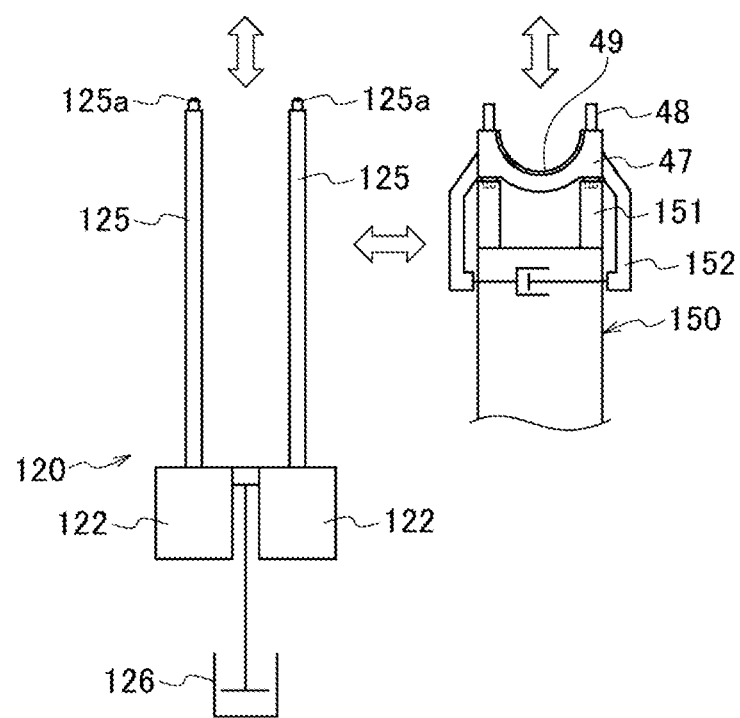

FIG.6A
FIG.6B
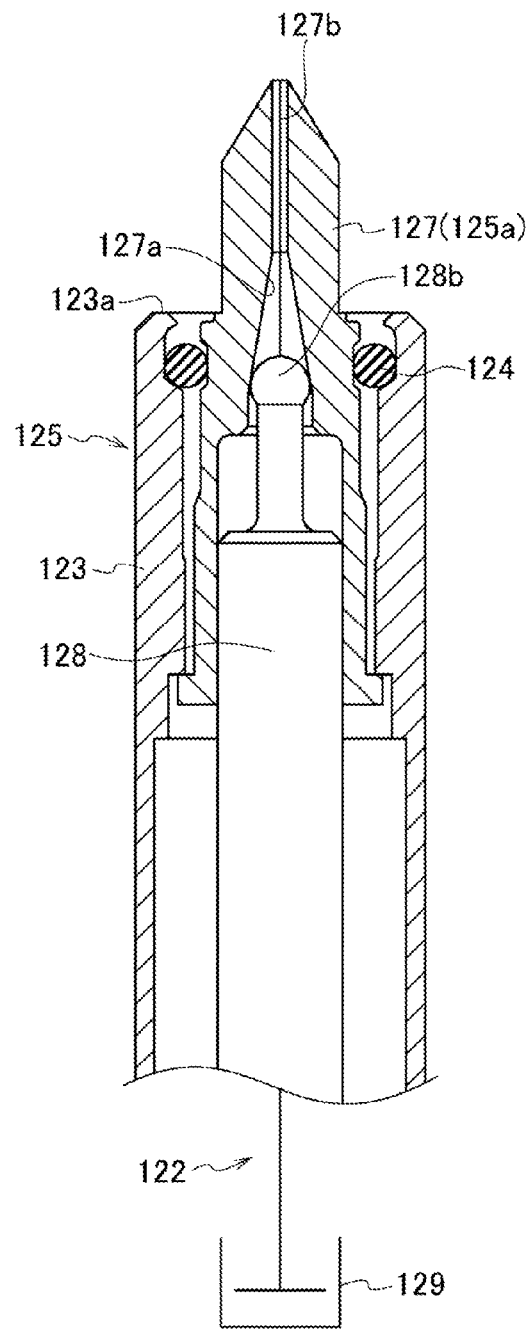
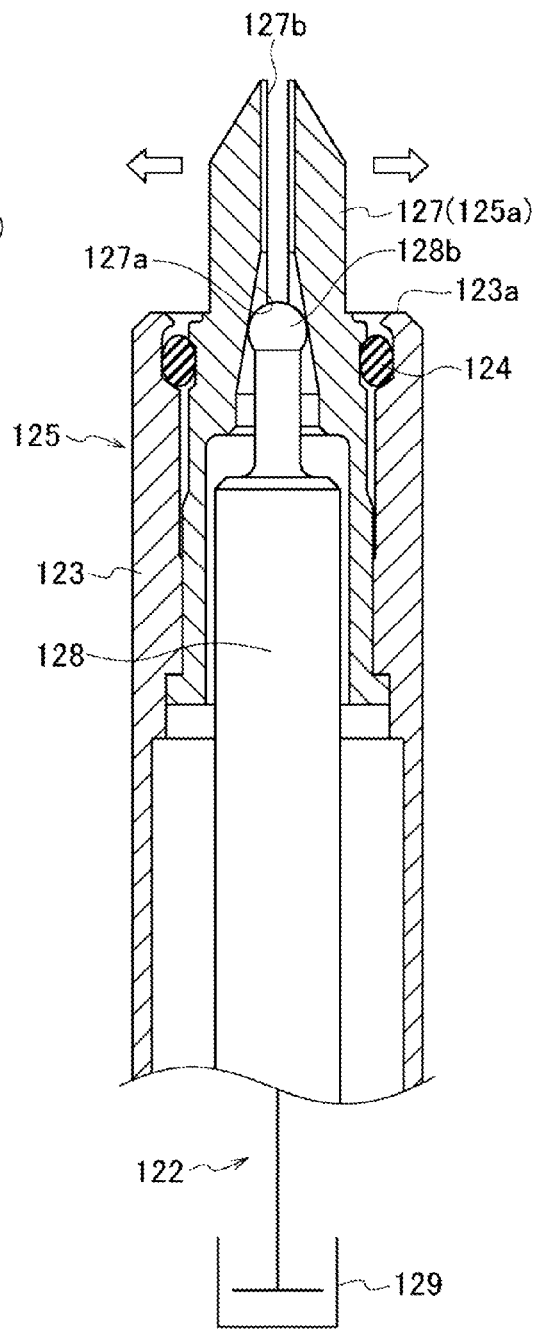

METHOD AND DEVICE FOR MOUNTING PISTON

TECHNICAL FIELD

The present invention relates to a method and a derive for mounting piston, wherein a piston with a connecting rod is inserted into a cylinder bore of a cylinder block of an engine, and the piston is connected to a crankshaft in a lower portion of the cylinder block.

BACKGROUND ART

In a related art there is a so-called split connecting rod that is manufactured by forming a semi-circular arc-shaped end portion of the connecting rod integrally with a connecting rod cap which is joined to the semi-circular arc-shaped end portion, machining a large end hole fitted to a crankpin, and then cracking and fracture-splitting, the integrally formed, piece into two pieces such as the semi-circular arc-shaped, end portion of the connecting rod and the connecting rod cap.

In this case, since joined surfaces between the semi-circular arc-shaped end portion of the connecting rod and the connecting rod cap are formed as fractured surfaces which have small concavities and convexities, it is possible to join together both surfaces in a good connection state, and it is possible to improve the quality of the connecting rod. Since it is possible to simultaneously manufacture the split semi-circular arc-shaped end portion and the connecting rod via one splitting, it is possible to reduce the manufacturing costs of the connecting rod.

However, when the fractured surface of the semi-circular arc-shaped end portion is damaged (minute projection portions of asperities become flat) in the process of inserting the piston with the connecting rod into the cylinder bore of the cylinder block, the semi-circular arc-shaped end portion may not be accurately aligned with the connecting rod cap which is joined thereto in a later step, which is a concern. Accordingly, when the split connecting rod is used, the piston is required to be inserted in such a way that none of components come into contact with the split fractured surface of the semi-circular arc-shaped end portion.

Such an insertion method in the related art is disclosed in patent literature 1. In this method, two connecting rod guides are inserted into the cylinder bore of the cylinder block before the piston with the connecting rod is inserted thereinto, the connecting rod guides are inserted into holes in both end portions of the semi-circular arc-shaped end portion of the connecting rod in such a way that end surfaces (split fractured surface) of the semi-circular arc-shaped end portion do not come into contact with the connecting rod guides, and a jig (piston pusher) for pushing the piston inward and the connecting rod guides move downward while being synchronous with each other such that the piston is inserted into the cylinder bore, and the semi-circular arc-shaped end portion of the connecting rod sits on the crankpin of the crankshaft. Since the connecting rod guides are used, while the piston is inserted into the cylinder bore, the oscillation (swing, rotation, or the like) of the connecting rod is restricted so that a fitting surface of the semi-circular arc-shaped end portion or a metal bearing can be prevented from being damaged.

A piston assembly apparatus disclosed in patent literature 2 inserts a tip end of a guide bar into a bolt hole of a large end of the connecting rod attached to the piston, and moves a tip end portion of a locking shaft inserted into a hollow portion of the guide bar, and thus the tip end of the guide bar is pushed open, the tip end of the guide bar is engaged with the bolt hole of the large end of the connecting rod, and in this state, the piston is pulled into the cylinder bore.

RELATED ART LITERATURE

Patent Literature

Patent Literature 1: Japanese Patent No. 4213096
Patent Literature 2: Japanese Patent No. 3334519

SUMMARY OF THE INVENTION

Problem that the Invention is to Solve

In the piston insertion method disclosed in patent literature 1, since it is necessary to move the jig for pushing the piston inward and the connecting rod guides mechanically in synchronization with each other. Therefore, when the piston is automatically inserted, a movement mechanism or movement control becomes complicated, and costs are increased.

The piston assembly apparatus disclosed in patent literature 2 is not designed in such a way as to be used for a split connecting rod, and cannot be used for a connecting rod with bag-like holes.

The present invention is made in light of these matters, and an object of the present invention is to provide a piston assembly method and a piston assembly apparatus that can promptly assemble a piston to a cylinder block using simple means while maintaining high-quality end surfaces of a semi-circular arc-shaped end portion of a connecting rod.

Means for Solving the Problem

In order to achieve this object, according to the invention of aspect 1, there is provided a piston assembly method by which a piston (for example, a piston 30 in an embodiment to be described later) assembled with a connecting rod (for example, a connecting rod 40 in the embodiment to be described later) is inserted into a cylinder bore (for example, a cylinder bore 11 in the embodiment to be described later) of a cylinder block (for example, a cylinder block 10 in the embodiment to be described later) to which a crankshaft (for example, a crankshaft 20 in the embodiment to be described later) is assembled, and a connecting rod cap (for example, a connecting rod cap 47 in the embodiment to be described later) is tightened to the connecting rod such that the piston is connected to the crankshaft, including:

a step of inserting a guide rod (for example, a guide rod 125 in the embodiment to be described later), which has a diameter expandable tip end portion (for example, a tip end portion 125a in the embodiment to be described later) and restricts an oscillation, of the connecting rod and the piston, into the cylinder bore via an opening adjacent to a crank chamber of the cylinder bore (for example, an opening 11b adjacent to a crank chamber in the embodiment to be described later);

a step of inserting the piston via a cylinder head mounting side opening (for example, a cylinder head mounting side opening 11a in the embodiment to be described later) of the cylinder bore with the connecting rod positioned at a leading end;

a step of engaging the connecting rod with the guide rod by increasing a diameter of the tip end portion of the guide rod in a hole (for example, a female screw hole 45 in the embodiment to be described later) of a semi-circular arc-shaped end portion (for example, a semi-circular arc-shaped end portion 42 in the embodiment to be described later) which is positioned at a tip end of the connecting rod in an insertion direction;

a step of pulling the connecting rod into the cylinder bore by moving the guide rod until the semi-circular arc-shaped end portion of the connecting rod sits on a crankpin (for example, a crankpin 25 in the embodiment to be described later) of the crankshaft;

a step of moving the guide rod away from the cylinder bore; and a step of tightening the connecting rod cap to the semi-circular arc-shaped end portion of the connecting rod.

The invention of aspect 2 provides the configuration of aspect 1, wherein, in the step of pulling the connecting rod, the piston is pulled into the cylinder bore diagonally to a vertical direction.

The invention, of aspect 3 provides the configuration of aspect 1 or 2, wherein an oil jet (for example, an oil jet 50 in the embodiment to be described later) for ejecting oil toward a back side of the piston is assembled to the cylinder block in advance, and wherein in the step of pulling the connecting rod, when the oil jet interferes with the connecting rod being inserted into the cylinder bore, the guide rod inserted into the cylinder bore is moved such that the connecting rod moves away to a non-interference position from a position where the connecting rod interferes with the oil jet, the piston is pulled to a predetermined position in this state, the guide rod returns to an original position, of thereof and the piston is continuously pulled in.

The invention of aspect 4 provides the configuration of any one of aspect 1 to 3, wherein the pistons are simultaneously assembled into multiple cylinder bores of the cylinder block.

According to the invention of aspect 5, there is provided a piston assembly apparatus which inserts a piston (for example, a piston 30 in an embodiment to be described later) assembled with a connecting rod (for example, a connecting rod 40 in the embodiment to be described later) into a cylinder bore (for example, a cylinder bore 11 in the embodiment to be described later) of a cylinder block (for example, a cylinder block 10 in the embodiment to be described later) to which a crankshaft (for example, a crankshaft 20 in the embodiment to be described later) is assembled, and tightens a connecting rod cap (for example, a connecting rod cap 47 in the embodiment to be described later) to the connecting rod such that the piston is connected to the crankshaft, including:

a cylinder block positioning portion (for example, cylinder block positioning portion 110 in the embodiment to be described later) for positioning the cylinder block at a predetermined position;

a crankshaft turning portion for turning the crankshaft, and indexing a turning angle of the crankshaft;

a guide rod (for example, a guide rod 125 in the embodiment to be described later) which is disposed in a hole (for example, a female screw hole 45 in the embodiment to be described later) formed in a semi-circular arc-shaped end portion (for example, a semi-circular arc-shaped end portion 42 in the embodiment to be described later) of the connecting rod, and which has a diameter expandable tip end portion (for example, a tip end portion 125*a* in the embodiment to be described later) and restricts an oscillation of the connecting rod and the piston;

a guide rod engaging portion (for example, guide rod engaging portion 122 in the embodiment to be described later) for engaging the connecting rod with the guide rod by increasing a diameter of the tip end portion of the guide rod in the hole of the semi-circular arc-shaped end portion of the connecting rod;

a guide rod drive portion (for example, guide rod drive portion 126 in the embodiment to be described later) for inserting the guide rod into the cylinder bore via an opening adjacent to a crank chamber of the cylinder bore (for example, an opening 11*b* adjacent to a crank chamber), and pulling the guide rod inward which is engaged with the connecting rod; and a connecting rod cap tightening portion (for example, connecting rod cap tightening portion 150 in the embodiment to be describe later) for tightening the connecting rod cap to the semi-circular arc-shaped end portion of the connecting rod which sits on a crankpin (for example, a crankpin 25 in the embodiment to be described later) of the crankshaft.

The invention of aspect 6 provides the configuration of aspect 5, further including:

a piston supply unit (for example, a piston supply unit 130 in the embodiment to be described later) which includes an insertion jig (for example, an insertion jig 131 in the embodiment to be described later) which can hold the piston assembled with the connecting rod, and which is able to reciprocate the insertion jig between a piston loading position (for example, a piston loading position SP) where the piston is loaded onto the insertion jig and a piston insertion position (for example, a piston insertion position WP) where the piston held by the insertion jig is inserted into the cylinder bore via a cylinder head mounting side opening (for example, a cylinder head mounting side opening 11*a* in the embodiment to be described later).

The invention of aspect 7 provides the configuration of aspect 6, further including:

a piston transport robot (for example, a piston transport robot 160 in the embodiment to be described later) which has at least three gripping claws (for example, four gripping claws 162 in the embodiment to be described later) for pressing piston rings (for example, piston springs 32 in the embodiment to be described later) of the piston inward in a radial, direction to grip the piston rings of the piston, and which transports the piston to load the piston onto the insertion jig, wherein the insertion jig has a cut-away portion (for example, a cut-away portion 133 in the embodiment to be described later) for preventing interference between the insertion jig and the gripping claws when the piston is loaded.

The invention of aspect 8 provides the configuration of aspect 5, further including:

a cap supply unit (for example, a cap supply unit 180 in the embodiment to be described later) which supplies the connecting rod cap to a gap between the connecting rod cap tightening portion and the semi-circular arc-shaped end portion of the connecting rod which sits on the crankpin of the crankshaft.

The invention of aspect 9 provides the configuration of aspect 5, wherein, the guide rod engaging portion includes a collet (for example, a collet 127 in the embodiment to be described later) forming the tip end portion of the guide rod which is divided into multiple pieces by a slit (for example, a slit 127b in the embodiment to be described later) axially formed, and a collet pusher (for example, a collet pusher 128 in the embodiment to be described later) increasing the diameter of the tip end portion by pressing a tapered surface (for example, a tapered surface 127a in the embodiment to be described later) in the collet, and wherein, a tip end of the collet pusher is an inclined surface (for example, an inclined surface 128a in the embodiment to be described later) which resembles the tapered surface.

Advantage of the Invention

According to the invention of aspects 1 and 5, the diameter of the tip end portion of the guide rod is increased in the hole of the semi-circular arc-shaped end portion of the connecting rod, and thus the connecting rod is engaged with the guide rod, and the connecting rod and the piston are pulled into the cylinder bore. Therefore, a push-in jig in the related art is not required, and it is not necessary to push the piston inward synchronously with the movement of the guide rod. Since a function for synchronization is not required, it is possible to assemble the piston using only simple means. Since the connecting rod can be inserted into the cylinder bore in a state where the connecting rod is engaged with the guide rod regardless of the shape of the hole of the semi-circular arc-shaped end portion of the connecting rod, it is possible to achieve a high-quality assembly of the piston using a simple configuration without damaging an end surface of the semi-circular arc-shaped end portion of the connecting rod, or an inner wall of the cylinder bore.

According to the invention of aspect 2, since the piston can be diagonally inserted into the cylinder bore, the invention can be used for the assembly of a V-type engine.

According to the invention of aspect 3, in a case where the oil jet is assembled to cylinder block in advance, and may interfere with the connecting rod when the piston is inserted into the cylinder bore, it is possible to insert the connecting rod into the cylinder bore while avoiding interference between the connecting rod and the oil jet by shifting the connecting rod in an axial direction of the crankshaft. Therefore, it is possible to assemble the piston with the connecting rod in a high quality manner while ensuring the degree of freedom in engine design regarding the installation of the oil jet.

According to the invention of aspect 4, due to the indexing of the crankshaft, the pistons can be simultaneously inserted into the cylinder bores for which the crankpins are at the same phase, and it is possible to improve efficiency in an assembly process for an in-series 4-cylinder engine or a V-type 6-cylinder engine.

According to the invention of aspect 6, since it is possible to reciprocate the insertion jig holding the piston while changing the position of the piston supply unit between the piston loading position and the piston insertion position, it is possible to improve the degree of freedom in the layout of parts of the assembly apparatus, and to simply design a mechanism such as the piston transport robot.

According to the invention of aspect 7, the piston transport robot, which loads the piston onto the insertion jig, has at least three gripping claws which grip the piston rings while pressing the piston rings inward in the radial direction, and the insertion jig has the cut-away portion such that the insertion jig is prevented from interfering with the gripping claws. Therefore, it is possible to load the piston onto the insertion jig without damaging the piston rings, and it is possible to assemble the piston with the connecting rod while maintaining the quality of the piston rings.

According to the invention of aspect 8, since the cap supply unit supplies the connecting rod cap to a gap between the connecting rod cap tightening portion and the semi-circular arc-shaped end portion of the connecting rod which sits on the crankpin of the crankshaft, it is possible to supply the connecting rod cap by simple motions such as a straight motion, and to easily perform a tightening operation, and it is possible to simplify a connecting rod cap tightening mechanism.

According to the invention of aspect 9, since the tip end of the collet pusher, which presses the collet inward and increases the diameter of the collet, is configured as the inclined surface which resembles the tapered surface of the collet, the contact area of the collet pusher is increased, and it is possible to improve durability.

BRIEF DESCRIPTION OF THE DRAWINGS

FIG. 5 is a view illustrating a piston assembly method and the piston assembly apparatus in the embodiment of the present invention.

FIG. 6A is a sectional view of main parts of a guide rod before the diameter of a tip end portion of the guide rod is increased, and FIG. 6B is a sectional view of the main parts of the guide rod after the diameter of the tip end portion of the guide rod is increased.

MODE FOR CARRYING OUT THE INVENTION

Figure 7:
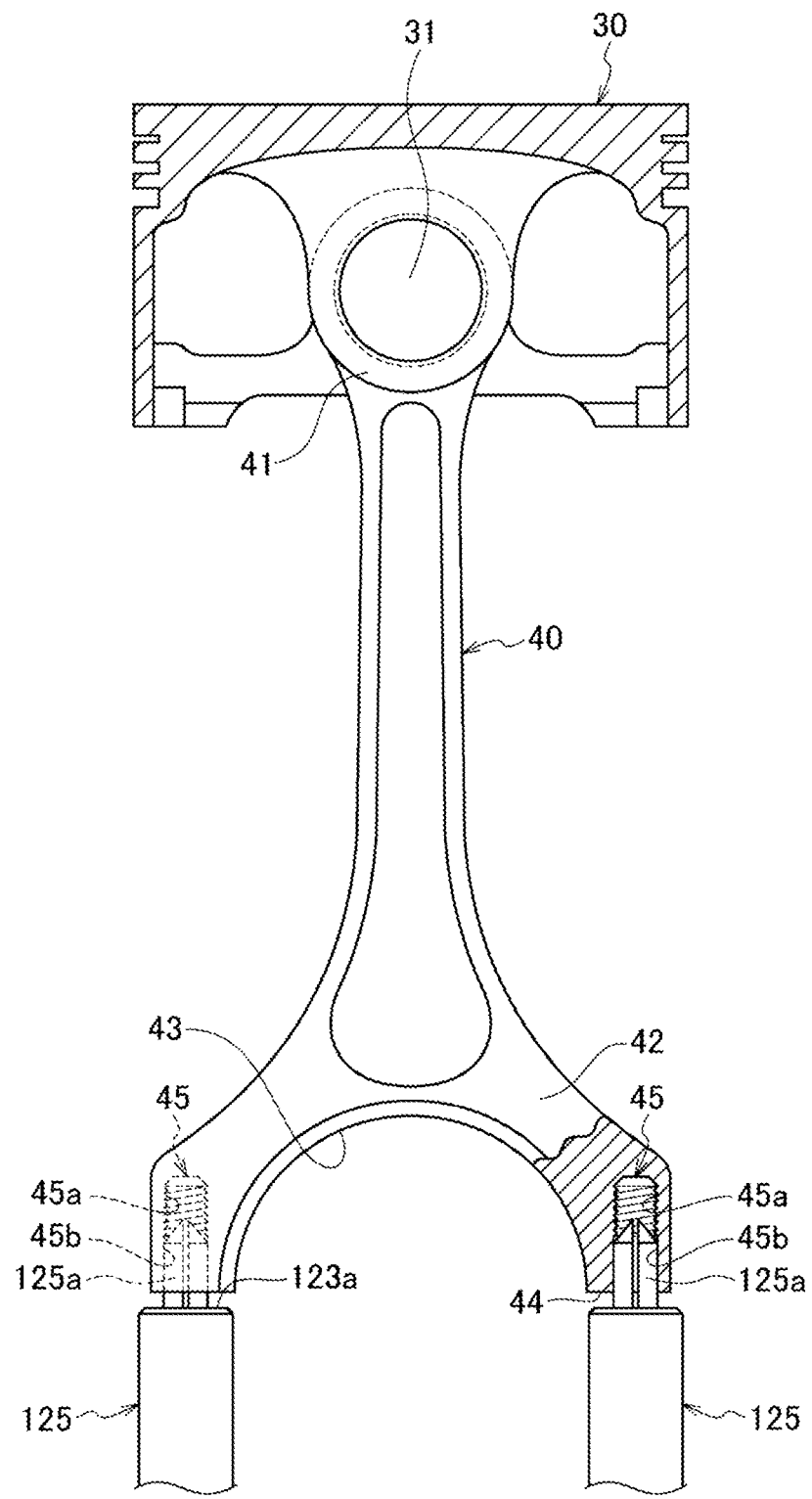
FIG. 7 is an enlarged view illustrating a state in which the tip end portion is engaged into a hole of a semi-circular arc-shaped end portion of a connecting rod.
Figure 13:
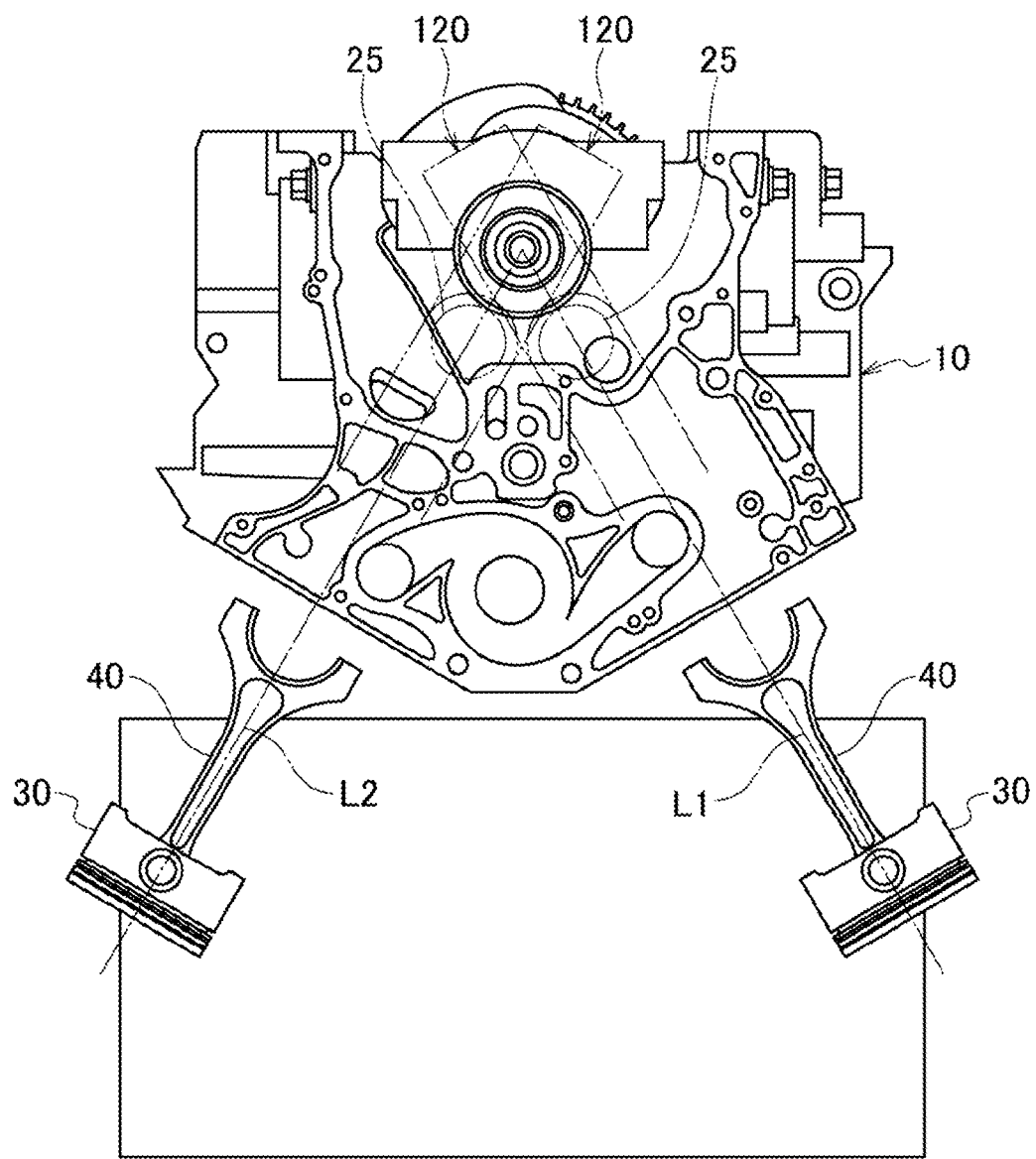
FIG. 13 is a view illustrating that the assembly method in the embodiment of the present invention can be used to simultaneously insert two pistons into cylinder bores of a V-type engine.
Figure 14:
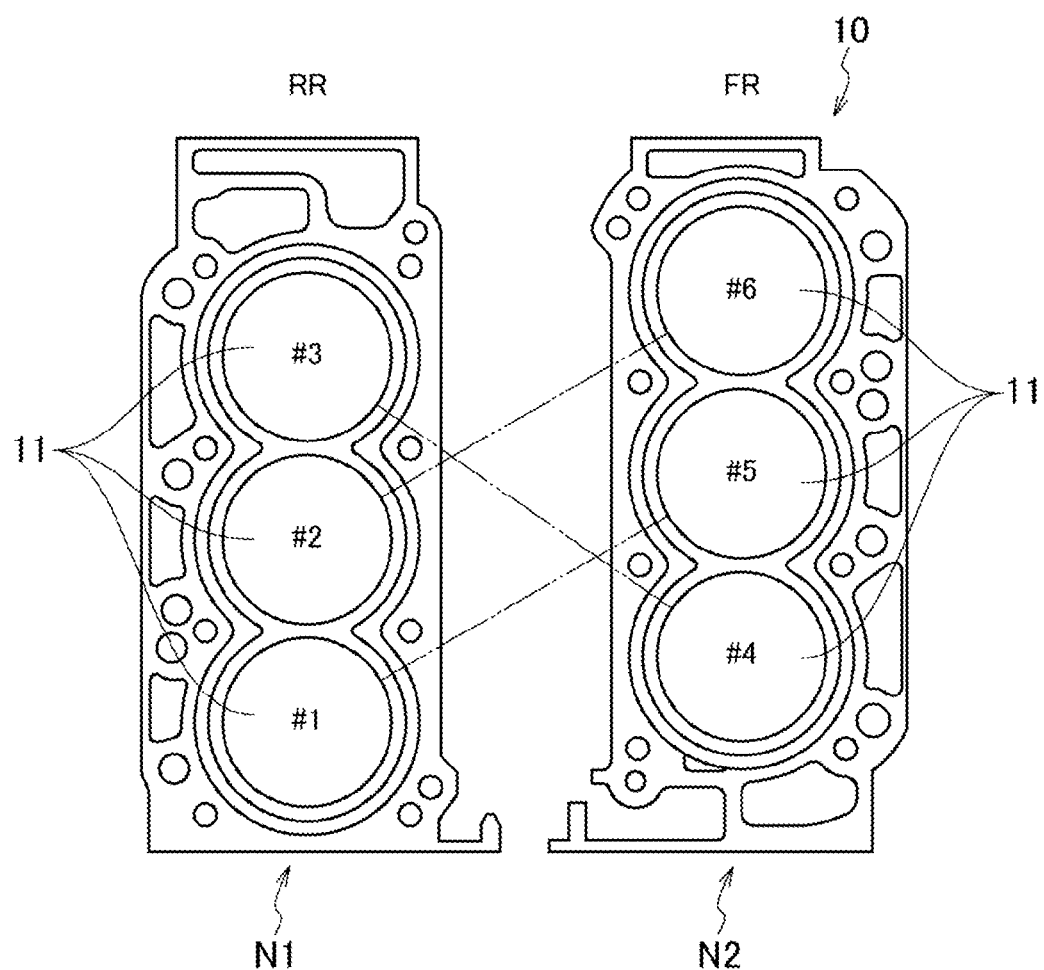
FIG. 14 is a view illustrating pairs of cylinders, the top dead centers of which are at the same phase, and into which the pistons can be simultaneously assembled among six cylinders (#1 to #6) of a V-type 6-cylinder engine.

Hereinafter, an embodiment of the present invention will be described with reference to the accompanying drawings. FIGS. 1 to 4 are views illustrating the configuration of a piston assembly apparatus in the embodiment, FIGS. 5 to 7 are views illustrating a piston assembly method and the piston assembly apparatus, and FIGS. 8 to 12 are views illustrating a sequence of assembling a piston with a connecting rod. FIGS. 13 and 14 are views illustrating an example of a V-type 6-cylinder engine to which the present invention is applied.

An engine, which is an assembly target in the embodiment, will be briefly described before a description of the piston assembly method and the piston assembly apparatus will be given.

An engine illustrated in FIGS. 13 and 14 is a V-type 6-cylinder engine, and has six cylinders (cylinder bores 11) #1 to #6 which are arrayed in two rows in a single cylinder block 10 at a bank angle of 60°. Each pair of pistons 30 is set to operate at the same phase, and three pairs of the pistons 30, inserted into the six cylinders, operate with a phase difference of 120° in a crankshaft rotation angle.

As illustrated in FIG. 14, among three cylinders #1, #2, and #3 of row N1 in one bank and three cylinders #4, #5, and #6 of row N2 in the other bank, the cylinders #1 and #5, the cylinders #2 and #6, and the cylinders #3 and #4 are pairs of the cylinders which are at the same phase on different banks, and two cylinders which are at the same phase are separated from each other by a crankshaft rotation angle of 60° equivalent to the bank angle (an angle formed by bore center lines L1 and L2 in FIG. 5). Accordingly, as illustrated in FIG. 5, crankpins 25, which correspond to the pistons 30 operating at the same phase, of a crankshaft 20 are disposed around the rotation axis of the crankshaft 20 with an angle of 60° therebetween.

In FIG. 5, reference character 10 represents the cylinder block, and the crankshaft 20 is disposed in a lower portion of the cylinder block 10. The crankshaft 20 has the crankpins 25 offset by a predetermined distance relative to a rotation axis O of the crankshaft, and six crankpins 25 corresponding to the six pistons 30 are provided on the same circumference around the rotation axis O of the crankshaft 20 with an angle of 60° therebetween.

In FIG. 5, the crankpin 25 illustrated by the line alternating one long and two short dashes corresponds to one of the pistons which operate at the same phase, and is separated by an angle of 60° from the crankpin 25 illustrated by the solid line, and the crankpins 25 are positioned at the top dead centers of the cylinder bores 11. A balance weight 23 is provided in the crankshaft 20.

The piston 30 includes piston rings 32 (Refer to FIG. 4, and not illustrated in FIGS. 5, and 7 to 12) on the outer circumference thereof, and an upper end portion (small end) 41 of a connecting rod 40 is inserted into and is rotatably connected to the piston 30 using a piston pin 31 with a slight gap between the piston 30 and the upper end portion of the connecting rod 40 in an axial direction.

A split semi-circular arc-shaped end portion 42 is provided on a lower end portion (large end) of the connecting rod 40. After the semi-circular arc-shaped end portion 42 is formed integrally with a connecting rod cap 47 in a manufacturing stage, and a large end hole fitted to the crankpin 25 is machined, an integrally formed piece is cracked and fracture-split into the semi-circular arc-shaped end portion 42 and the connecting rod cap 47, and thus an end surface 44 is a fractured surface with small concavities and convexities. Semi-circular arc plate-like metal bearings are fitted to an inner circumferential surface 43 of the semi-circular arc-shaped end portion 42, which undergoes the hole machining process, and an inner circumferential surface 49 of the connecting rod cap 47.

Female screw holes 45 are respectively formed in both end portions of the semi-circular arc-shaped end portion 42 of the connecting rod 40, and bolts 48 for joining the connecting rod cap 47 to the connecting rod 40 are tightened into the female screw holes 45. Each of the female screw holes 45 is formed in the shape of a bag, and has a screw portion 45a in a bottom portion of the female screw hole 45, and a circular cylindrical surface 45b close to an opening thereof with no screw machined in the circular cylindrical surface 45b (Refer to FIG. 7.).

An oil jet 50 is installed in an inner wall portion adjacent to the cylinder bore 11 of the cylinder block 10 in a previous step before the piston 30 is assembled, and is configured to cool the piston 30 by ejecting oil toward a back side (a region adjacent, to a crank chamber 15) of the piston. The oil jet 50 is provided as a common component for two pistons 30 which slide against the adjacent cylinder bores 11, and is disposed at a position in which the oil jet 50 may slightly interfere with the connecting rod 40 when the piston 30 is inserted into the cylinder bore 11. Accordingly, when the piston 30 is inserted into the cylinder bore 11, it is necessary to avoid interference between the connecting rod 40 and the oil jet 50 by slightly moving the connecting rod 40 in the axial direction of the piston pin 33.

Figure 1:
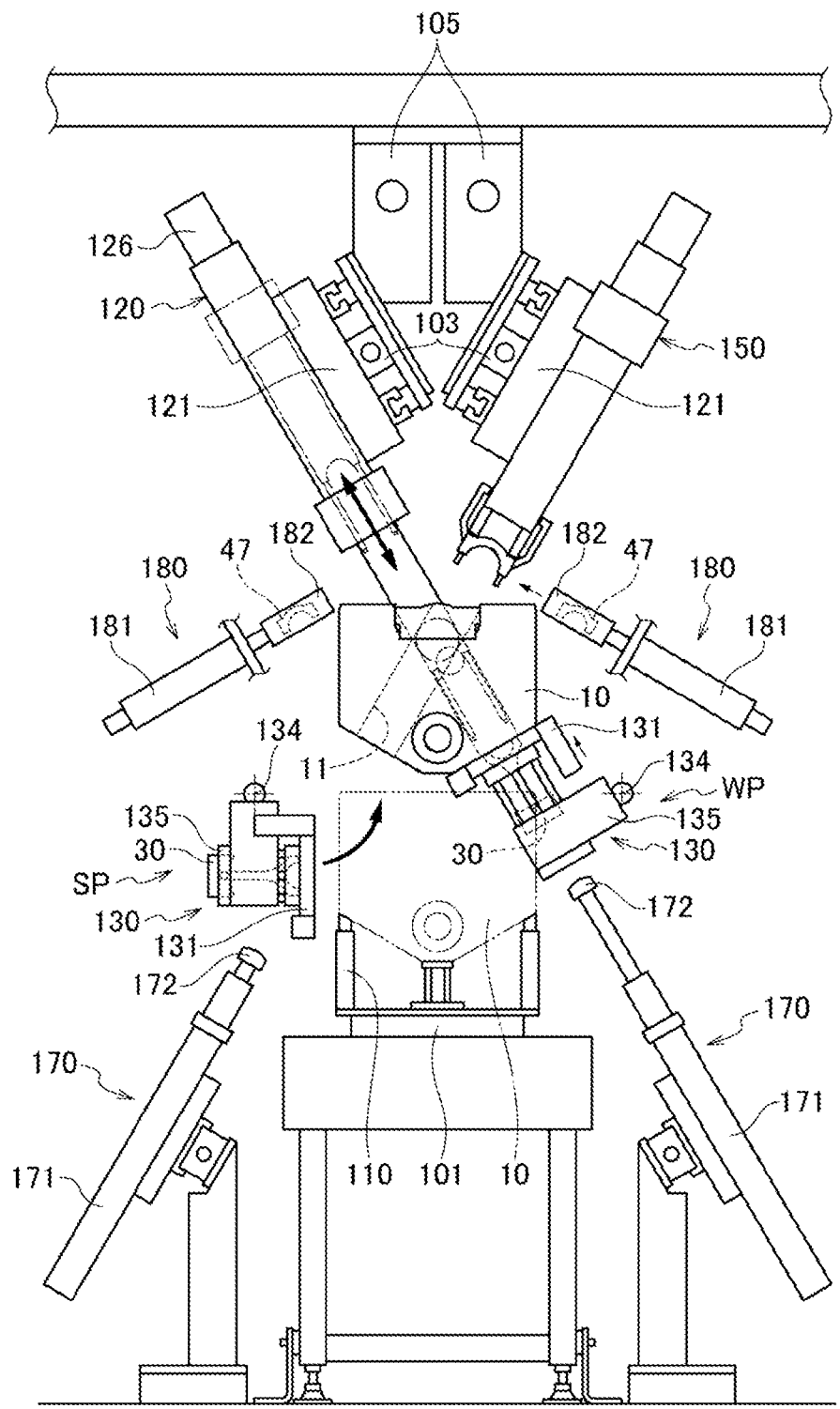
FIG. 1 is a side view of a piston assembly apparatus in an embodiment of the present invention.
Figure 2:
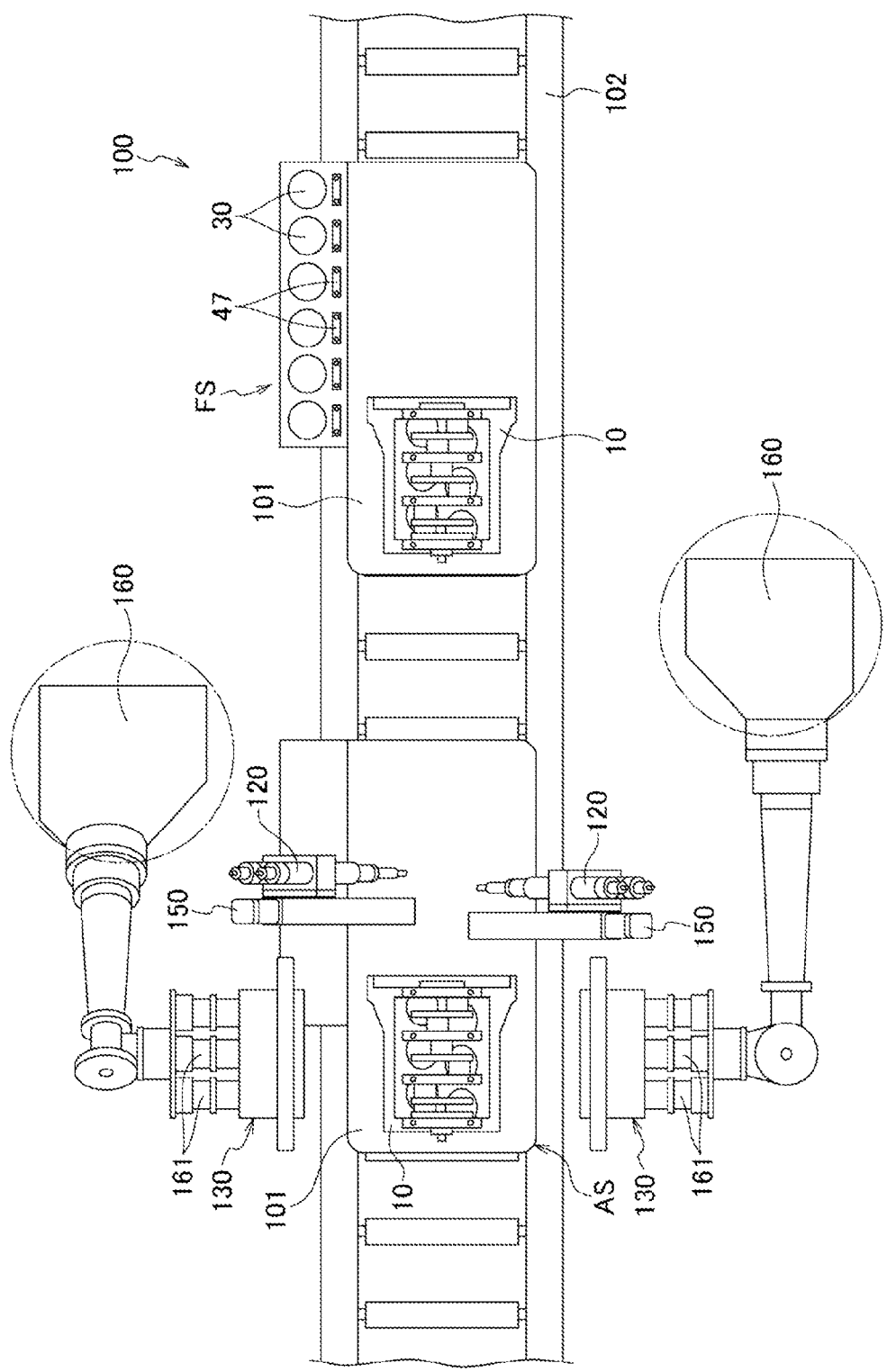
FIG. 2 is a plan view of the piston assembly apparatus illustrated in FIG. 1.
Figure 3:
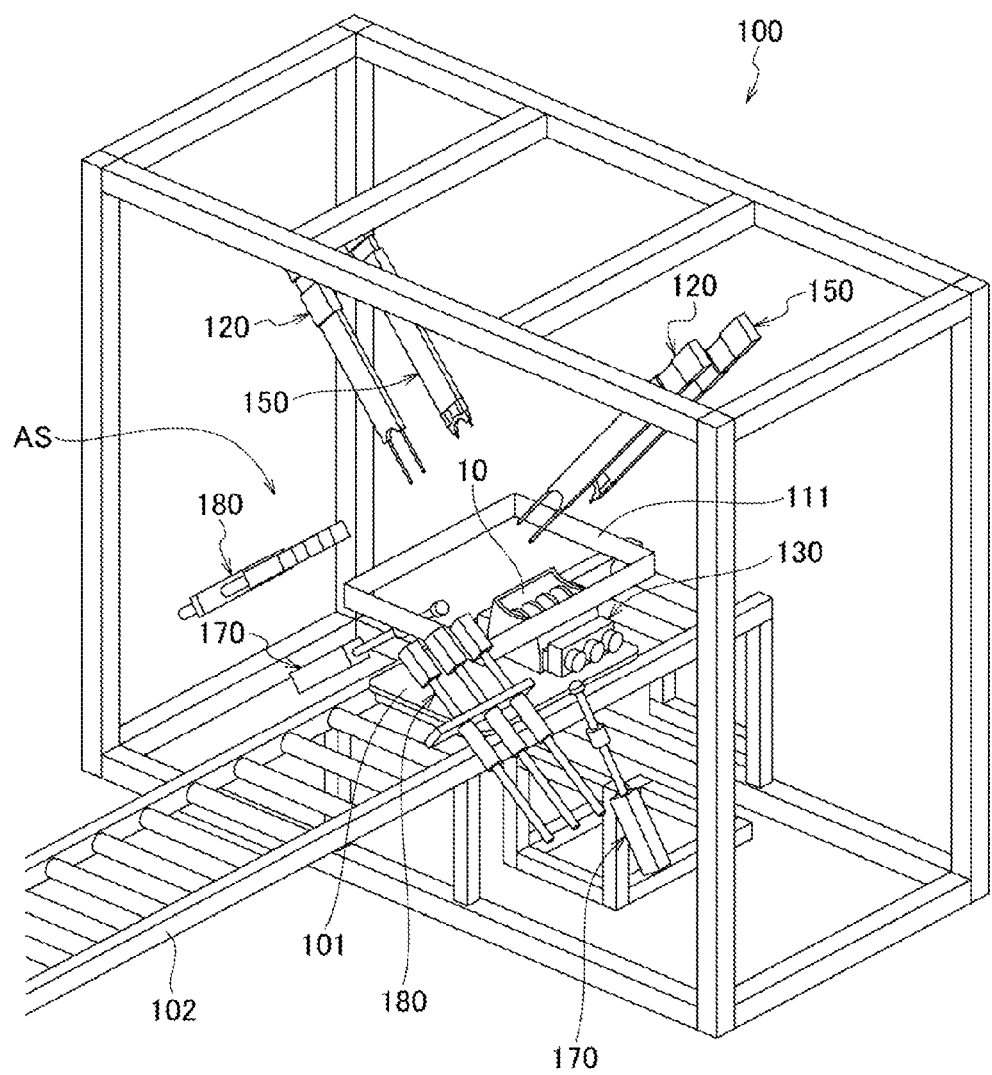
FIG. 3 is a perspective view of the piston assembly apparatus illustrated in FIG. 1.

Hereinafter, an assembly apparatus for assembling the piston 30 with the connecting rod 40 will be described. As illustrated in FIGS. 1 to 3, an assembly apparatus 100 includes a roller conveyer 102 that transports the cylinder block 10, the piston 30 with the connecting rod 40, and the connecting rod cap 47 which are mounted on a pallet 101. The pallet 101 is provided with a cylinder block positioning portion 110 for positioning the cylinder block 10 at a predetermined position.

In the embodiment, the cylinder block positioning portion 110 positions the cylinder block 10 (Refer to FIG. 13.) to be upside-down (a state in which a cylinder head mounting side opening 11a faces downward) at a predetermined assembly position in an assembly station AS using a lifting device (not illustrated), with the predetermined assembly position set above the roller conveyer 102, and the assembly station AS provided on a downstream side in a transport direction. In FIG. 3, reference character 111 represents a block holding frame which holds the cylinder block 10, and is driven by the lifting device. The cylinder block 10 may be positioned at the predetermined assembly position by the lifting device together with the pallet 101. The assembly position may be present on the roller conveyer 102, and in this case, the lifting device is not required.

A pair of piston supply unit 130 with insertion jigs 131 is provided on right and left sides of the cylinder block 10 (which is positioned at the predetermined assembly position) in such a way as to be able to turn around support shafts 134. Each of the insertion jigs 131 can extend and contract relative to a unit base 135 which is rotatably supported by the support shaft 134, and can come into contact with the cylinder head mounting side opening 11a (Refer to FIG. 5.) of the cylinder block 10.

The insertion jig 131 has a through hole 132 (Refer to FIG. 5.) in which a tapered portion is continuous with a straight portion, and the through hole 132 communicates with the cylinder bore 11. In a state where the diameters of the piston rings 32 are reduced and the piston rings 32 are prevented from floating off by four gripping claws 162 of a piston transport robot 160 (to be described later), the four gripping claws 162 are inserted up into the straight portion of the through hole 132, and are set in the insertion jig 131.

The piston, supply unit 130 reciprocates the insertion jig 131 using a drive device which is not illustrated while the insertion jig 131 is turned between a piston loading position Sp in which the through hole 132 of the insertion jig 131 is oriented in a horizontal direction, and a piston insertion position WP in which the piston 30 held by the insertion jig 131 is inserted into the cylinder bore 11.

Insofar as the piston supply unit 130 can come into contact with the cylinder head mounting side opening 11a such that the piston 30 can be inserted into the cylinder bore 11, the piston supply unit 130 may be configured to not extend and contract.

The assembly apparatus 100 is provided with crankshaft turning portion (not illustrated) that turns the crankshaft 20, and indexes the turning angle of the crankshaft 20.

A guide rod drive portion 126 for driving the connecting rod guides 120 in an insertion direction toward the cylinder bore 11, a connecting rod cap tightening portion 150, and a cap supply unit 180 are diagonally provided on upper sides in a lateral direction of the roller conveyer 102 in such a way as to be able to have access to the cylinder block 10 positioned at the predetermined position. Similarly, push-in devices 170 are diagonally provided toward the cylinder block 10 on lower sides in the lateral direction of the roller conveyer 102, and each of the push-in devices 170 includes a push-in tool 172 at the tip end thereof, and is extracted and contracted by an air cylinder 171.

The connecting rod guide 120, the guide rod drive portion 126, and the connecting rod cap tightening portion 150 are supported by a frame 121 that is driven to be able to axially move relative to an equipment frame 105 by drive portion 103. Accordingly, the connecting rod guide 120, the guide rod drive portion 126, and the connecting rod cap tightening portion 150 can move in an axial direction of the crankshaft 20, and face the corresponding cylinder bore 11 of the cylinder block 10 positioned at the predetermined position.

A movement direction, of the connecting rod guide 120, the connecting rod cap tightening portion 150, and the push-in device 170 is set such that the connecting rod guide 120, the connecting rod cap tightening portion 150, and the push-in device 170 extract and contract along the bore center lines L1 and L2 (in the insertion direction toward the cylinder bore 11) of the cylinder block 10 positioned at the predetermined position.

The cap supply unit 180 includes a cap holding portion 182 which can move forward and backward relative to a frame 183, and hold the connecting rod cap 47. An air cylinder 181 moves the cap supply unit 180 in a direction perpendicular to the movement direction of the connecting rod cap tightening portion 150, and supplies the connecting rod cap 47, held by the cap holding portion 182, to the connecting rod cap tightening portion 150.

As illustrated in FIG. 5, the connecting rod cap tightening portion 150 includes a tightening socket 151 that tightens the connecting rod cap 47 to the semi-circular arc-shaped end portion 42 of the connecting rod 40 sitting on the crankpin 25 of the crankshaft 20 with using bolts 48, and the connecting rod cap tightening portion 150 has multiple clamp claws 152 that clamp the connecting rod cap 47. The cap holding portion may be disposed in the connecting rod cap tightening portion 150 instead of being installed in the cap supply unit 180.

A pair of the piston transport robots 160 are respectively provided on both sides in the lateral direction of the roller conveyer 102, and each of the piston transport robots 160 supplies the piston 30 with the connecting rod 40 and the connecting rod cap 47 from the pallet 101 positioned in a previous station FS to the insertion jig 131 and the cap holding portion 182 of the cap supply unit 180.

Figure 4:
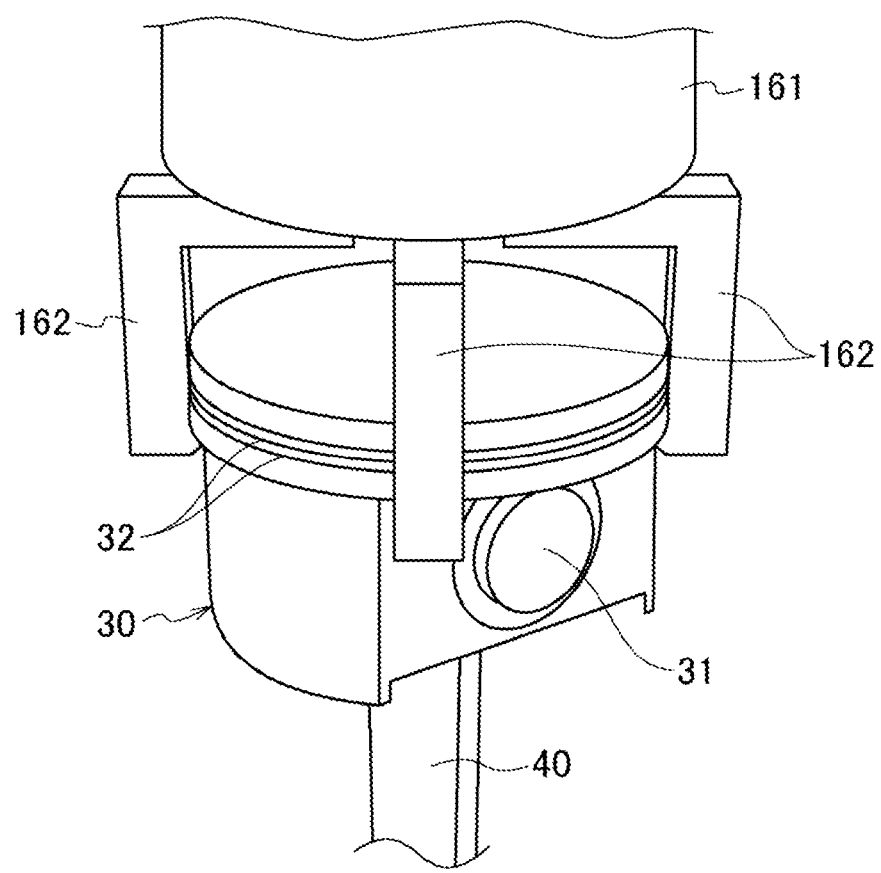
FIG. 4 is a perspective view illustrating a state in which gripping claws of a piston transport robot grip a piston in such a way that the diameters of piston rings are reduced.

As illustrated in FIG. 4, a robot hand 161 of the piston transport robot 160 loads the piston 30 onto the insertion jig 131, and has at least three (four in the embodiment) gripping claws 162 which grip the piston rings 32 while pressing the piston rings 32 inward in a radial direction. Accordingly, the piston transport robot 160 holds the piston 30 in a state where the diameters of the piston rings 32 are reduced by the gripping claws 162, and loads the piston 30 onto the insertion jig 131. Multiple U-shaped cut-away portions 133 are provided in the insertion jig 131 so as to prevent the insertion jig 131 from interfering with the gripping claws 162 when the piston 30 is loaded (Refer to FIG. 10.), and it is possible to reliably load the piston 30 onto the insertion jig 131 with the diameters of the piston rings 32 being reduced by loading the piston 30 onto the insertion jig 131 while inserting the gripping claws 162 into the cut-away portions 133. In the embodiment illustrated in FIG. 2, the piston transport robot 160 includes three pairs of the robot hands 161, and three pistons 30 are simultaneously loaded onto the insertion jigs 131; however, the pistons 30 may be loaded one by one. The robot hand 161 is provided with a holding portion (not illustrated) which holds three connecting rod caps 47.

With reference to FIG. 5, the connecting rod guide 120 includes diameter expandable tip end portions 125a, each of which is disposed in the female screw hole 45 formed in the semi-circular arc-shaped end portion 42 of the connecting rod 40, two guide rods 125 which are parallel to each other, and restrict the oscillation of the connecting rod 40 and the piston 30, and a guide rod engaging portion 122 that engages the connecting rod 40 with the guide rod 125 by increasing the diameter of the tip end portion 125a of the guide rod 125 in the female screw hole 45 of the semi-circular arc-shaped end portion 42 of the connecting rod 40.

As illustrated in FIG. 6, the tip end portion 125a of the guide rod 125 is configured as a hollow collet 127 that is formed separately from a holder portion 123 of the guide rod 125, and an O-ring 124 is disposed between the holder portion 123 and the collet 127. The collet 127 is configured such that the tip end portion 125a of the guide rod 125 is divided into multiple pieces by a slit 127b which is axially formed, and a tapered surface 127a required to increase the diameter of the collet 127 is formed inside the collet 127.

The guide rod engaging portion 122 includes a collet pusher 128 that is provided so as to move forward and backward on the tapered surface 127a in the collet 127 and in the holder portion 123, and an air cylinder 129 that drives the collet pusher 128. The tip end of the collet pusher 128 is configured as a spherical surface 128b. The air cylinder 129 pushes the collet pusher 128 inward, and thus a thrust force applied to the tapered surface 127a of the collet 127 is increased due to the tapered surface 127a. As a result, the diameter of the tip end portion 125a of the guide rod 125 is increased. The guide rod engaging portion 122 may have a hydraulic cylinder instead of the air cylinder 129.

As illustrated in FIG. 7, the outer circumferential surface of the tip end portion 125a faces the circular cylindrical surface 45b which is closer to the opening than the screw portion 45a in the female screw hole 45 of the semi-circular arc-shaped end portion 42 of the connecting rod 40, and when the diameter of the tip end portion 125a is increased, the tip end portion 125a is friction-gripped by the circular cylindrical surface 45b, and the connecting rod 40 is engaged with the guide rod 125.

The tip end portion 125a of the guide rod 125 is designed such that a clearance is ensured between a tip end surface 123a of the holder portion 123 and an end surface 44 of the semi-circular arc-shaped end portion 42. As a result, the end surface 44 of the semi-circular arc-shaped end portion 42 is not damaged when the connecting rod 40 is engaged with the guide rod 125.

The guide rod drive portion 126 drives the guide rods 125 in the insertion direction toward the cylinder bore 11. That is, the guide rod drive portion 126 inserts the guide rods 125 into the cylinder bore 11 via an opening 11b positioned adjacent to the crank chamber 15 of the cylinder bore 11, and pulls the guide rods 125 which are engaged with the connecting rod 40. When pulling in two guide rods 125 of the connecting rod guide 120 in a state where the connecting rod 40 is engaged with the guide rods 125, the guide rod drive portion 126 can drive the guide rods 125 such that the position of the connecting rod 40 in an X-Y plane (plane perpendicular to the bore center line L1) is restricted.

Hereinafter, a method of assembling the piston 30 with the connecting rod 40 will be described. According to the assembly method in the embodiment, the pairs of the cylinders 30 which are at the same phase, that is, the pair of the cylinders #1 and #5, the pair of the cylinders #2 and #6, and the pair of the cylinders #3 and #4, are simultaneously assembled diagonally from a lower side to an upper side in a vertical direction in a V-type 6-cylinder target engine illustrated in FIGS. 13 and 14. Accordingly, all the pairs of the cylinders 30 can be completely assembled in such a way that the pairs of the cylinders 30 are sequentially assembled, and thus it is possible to improve the efficiency of an assembly line.

The crankshaft 20 and the oil jets 50 are attached to the cylinder block 10 in advance.

For illustrative purposes, in the description given with reference to FIGS. 8 to 12, the piston 30 is assembled into one of the two cylinder bores 11 which are at the same phase, the cylinder head mounting side opening 11a is disposed to face upward, and the bore center line L1 of the cylinder bore 11 is oriented in the vertical direction, unlike the disposition of the cylinder bore 11 by the cylinder block positioning portion 110.

As illustrated in FIGS. 1 to 3, alter the roller conveyer 102 transports the pallet 101 to the assembly station AS while the cylinder block 10, the pistons 30 with the connecting rods 40, and the connecting rod caps 47 are mounted on the pallet 101, and the cylinder block 10 is positioned and fixed at the predetermined position, the crankshaft turning portion turns the crankshaft 20 such that the crankpins 25, which correspond to the cylinder bores 11 of the pair of the cylinders #1 and #5 that are at the same phase, reach the top dead centers. As illustrated in FIGS. 1 and 13, the cylinder block 10 is held at the predetermined position in the assembly station AS while the cylinder block 10 is turned upside down (a state in which the cylinder head mounting side opening 11a faces downward) by the cylinder block positioning portion 110.

The pair of the piston transport robots 160 loads three pistons 30 with the connecting rods 40 onto a pair of the right and left insertion jigs 131 positioned at the piston loading position SP, respectively. The pair of the piston transport robots 160 supplies the connecting rod caps 47 to the cap holding portion 182 of the cap supply unit 180 from the pallet 101.

Since each of the through holes 132 of the insertion jigs 131 in the piston supply unit 130 is oriented in the horizontal direction, each of the piston transport robots 160 is not required to perform complicated motions, and can easily load the piston 30. Since each of the piston transport robots 160 holds the piston 30 in a state where the diameters of the piston rings 32 are reduced by the gripping claws 162, and loads the piston 30 into the through hole 132 of the insertion jig 131, it is possible to load the piston 30 without damaging the piston rings 32.

Subsequently, each of the piston supply units 130 turns the unit base 135 around the support shaft 134, and extends the insertion jig 131 such that the insertion jig 131 moves to the piston insertion position WP in which the insertion jig 131 is in contact with the cylinder head mounting side opening 11a of the cylinder block 10, and is mounted on the cylinder block 10 (Refer to FIG. 5.).

Typically, the right and left piston supply units 130 synchronously operate; however, in FIG. 1, for ease of understanding, the piston supply unit 130 on the left side of the cylinder block 10 is illustrated as being at the piston loading position SP, and the piston supply unit 130 on the right side of the cylinder block 10 is illustrated as being at the piston insertion position WP.

Figure 8:
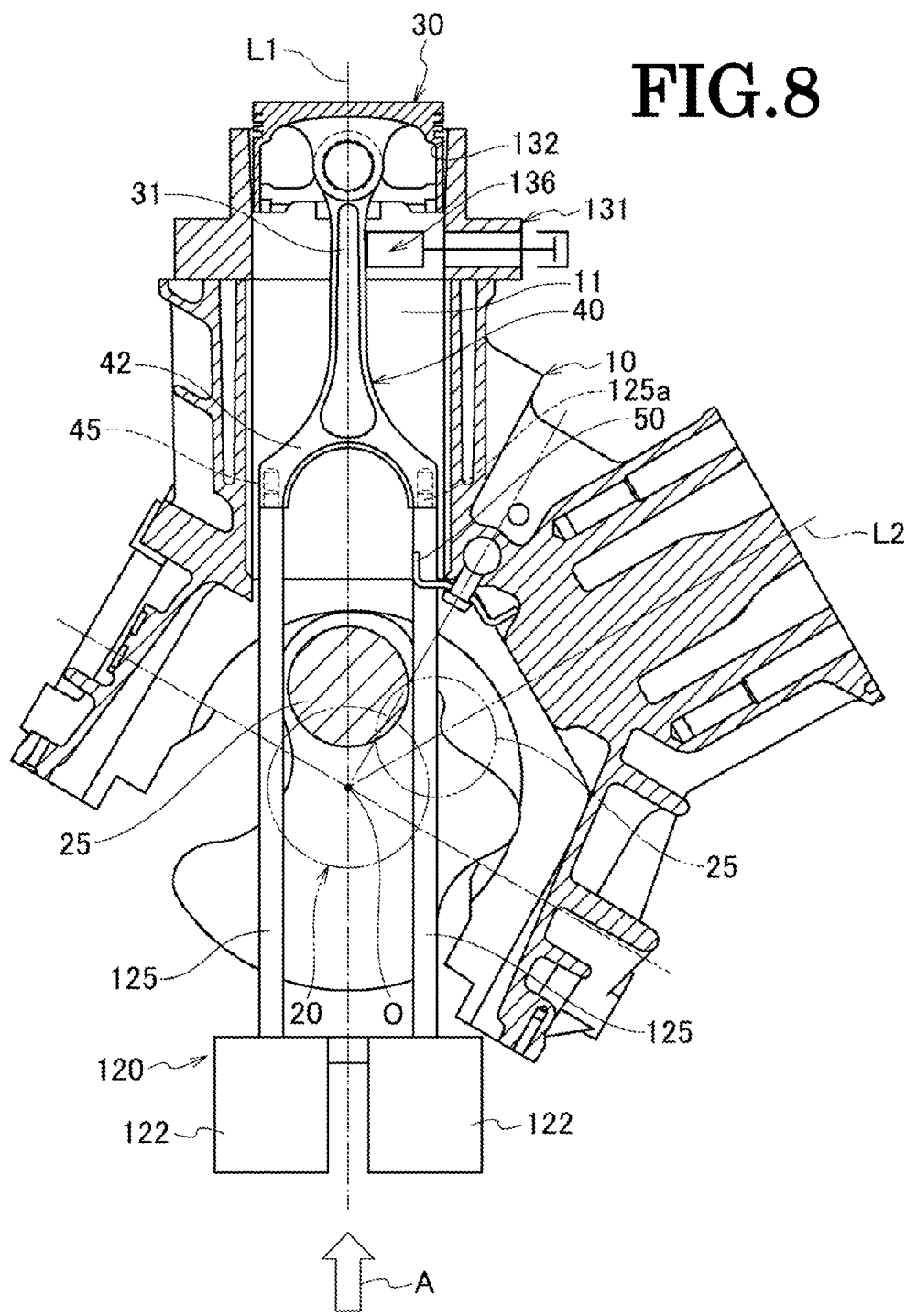
FIG. 8 is a sectional view illustrating a state in which two guide rods, which protrude from a connecting rod guide, are inserted into a cylinder bore, and the tip end portions are engaged into the holes of the semi-circular arc-shaped end portions of the connecting rod with respect to a crank pin indexing to a top dead center in the assembly method.

Accordingly, as illustrated in FIG. 8, after the crankshaft 20 rotates, and the crankpin 25 (fitting target) indexes to the top dead center with respect to the cylinder bore 11 which is a target for inserting the piston 30, the piston 30, guided by the insertion jig 131 of the piston supply unit 130, is inserted into the cylinder bore 11 via the cylinder head mounting side opening 11a with the connecting rod 40 positioned at a leading end in the insertion direction. Thereafter, the guide rod drive portion 126 moves the connecting rod guide 120 as illustrated by arrow A, and the guide rods 125 are inserted into the cylinder bore 11 via the opening 11b of the cylinder bore 11 adjacent to the crank chamber. The insertion jig 131 is provided with a tilt preventive portion 136 for preventing the connecting rod 40 from tilting when the piston 30 is diagonally inserted upward as illustrated in the embodiment.

Subsequently, the diameter of the tip end portion 125a of each of the guide rods 125 is increased in the female screw hole 45 of the semi-circular arc-shaped end portion 42 which is positioned at the tip end of the connecting rod 40 in the insertion direction, and thus the connecting rod 40 is engaged with the guide rods 125.

Figure 9:
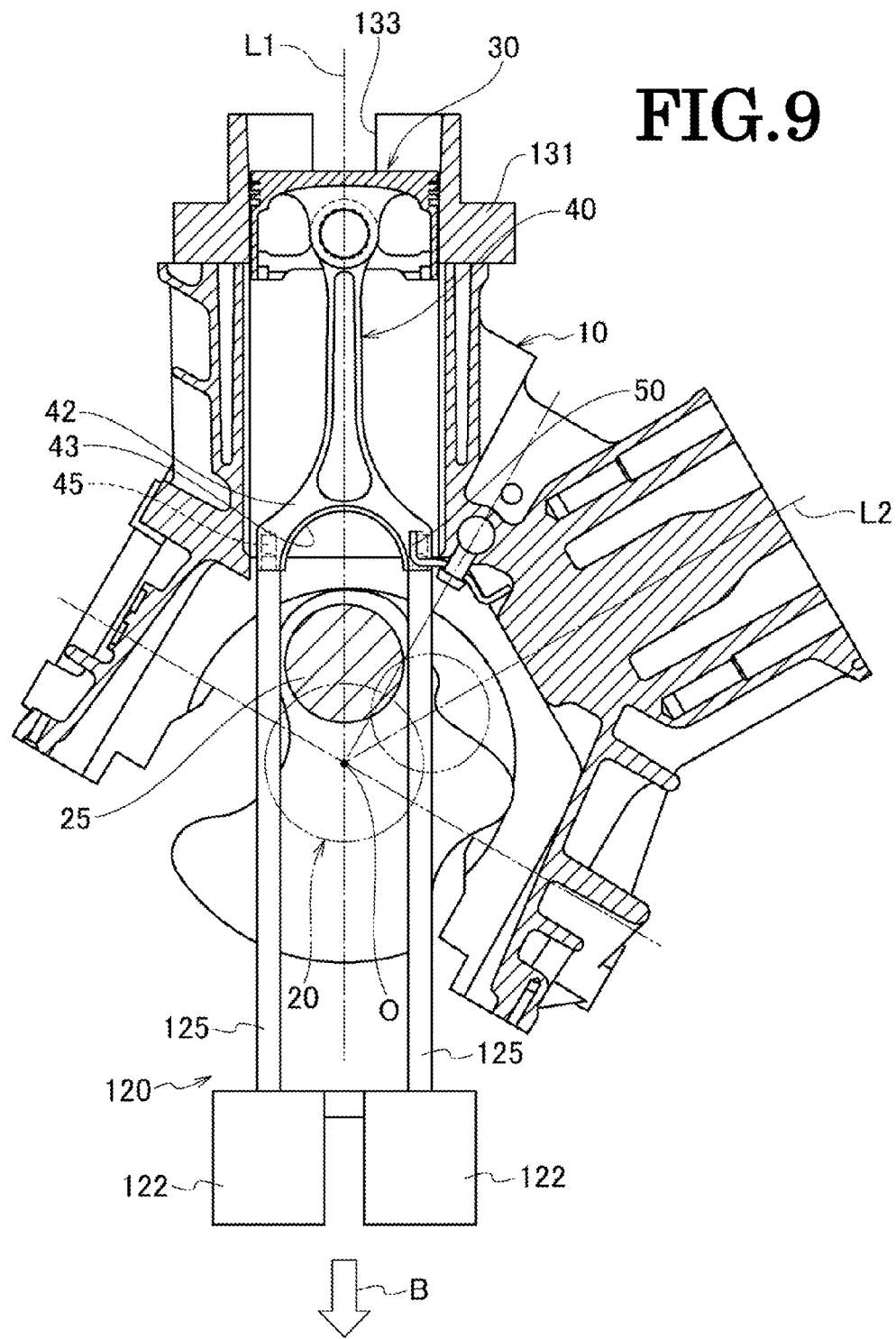
FIG. 9 is a sectional view illustrating a state in which the piston is pulled in while avoiding interfering with an oil jet, which is subsequent to the state illustrated in FIG. 8.

As illustrated in FIG. 9, the guide rod drive portion 126 (Refer to FIG. 5.) pulls the guide rods 125 into the cylinder bore 11 in a state where the connecting rod 40 is engaged with the guide rods 125. In a product design in which the connecting rod 40 interferes with the oil jet 50 when the piston 30 is pulled, the guide rods 125 inserted into the cylinder bore 11 are slightly moved in the axial direction of the piston pin 31 (the axial direction, of the crankshaft 20) such that the connecting rod 40 moves away to a non-interference position from the position in which the connecting rod 40 interferes with the oil jet 50, the piston 30 is pulled to a predetermined position in this state, the guide rods 125 return to their original positions, and then the piston 30 is continuously pulled.

Figure 10:
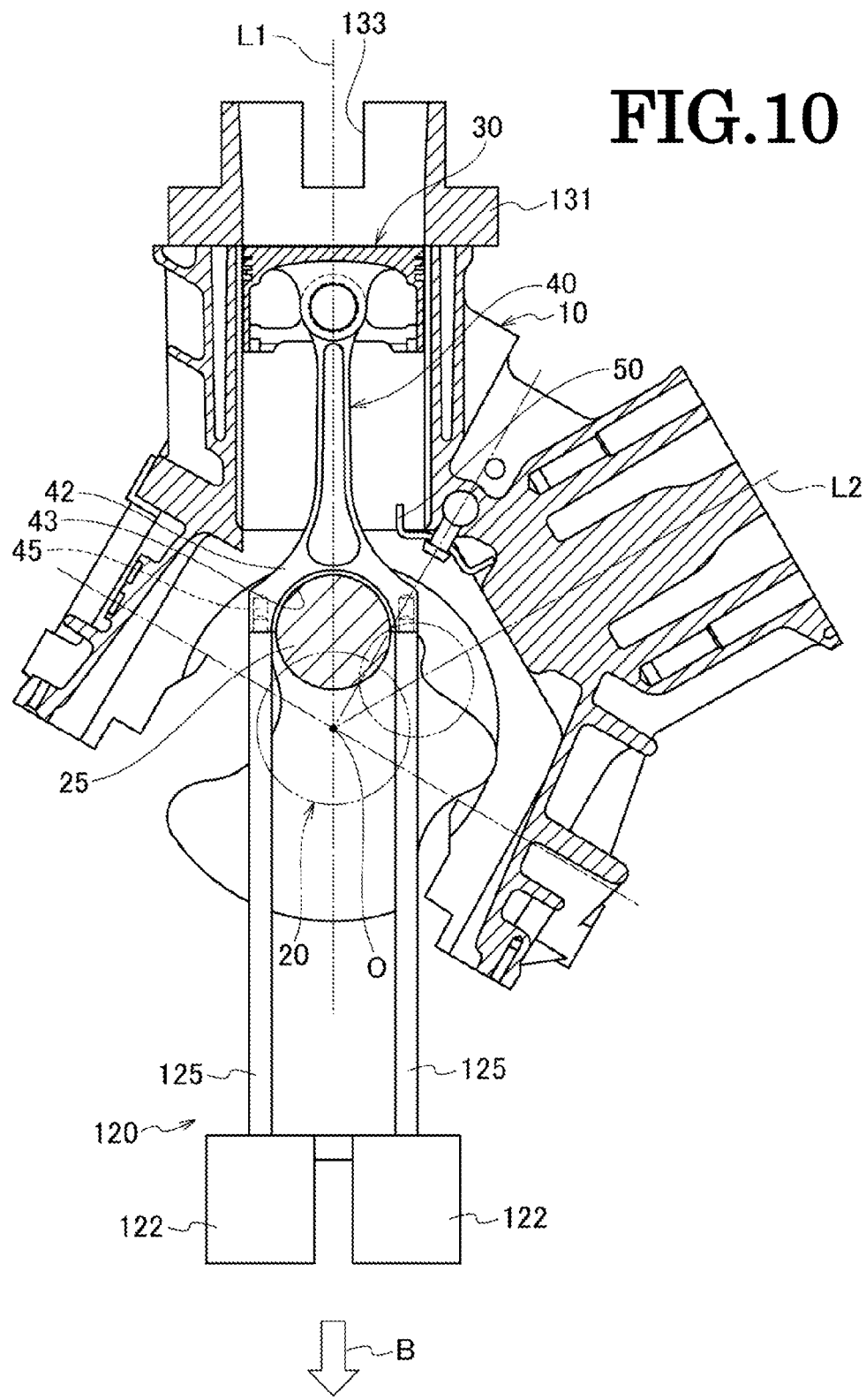
FIG. 10 is a sectional view illustrating a state in which the piston is pulled into the cylinder bore, and the semi-circular arc-shaped end portion of the connecting rod sits on the crank pin, which is subsequent to the state illustrated in FIG. 9.

The piston 30 is further pulled into the cylinder bore 11 while following the guide rods 125, and thus, as illustrated in FIG. 10, the semi-circular arc-shaped end portion 42 is fitted to the crankpin 25 of the crankshaft 20, with the semi-circular arc-shaped end portion 42 being positioned at the tip end of the connecting rod 40 in the insertion direction.

Figure 11:
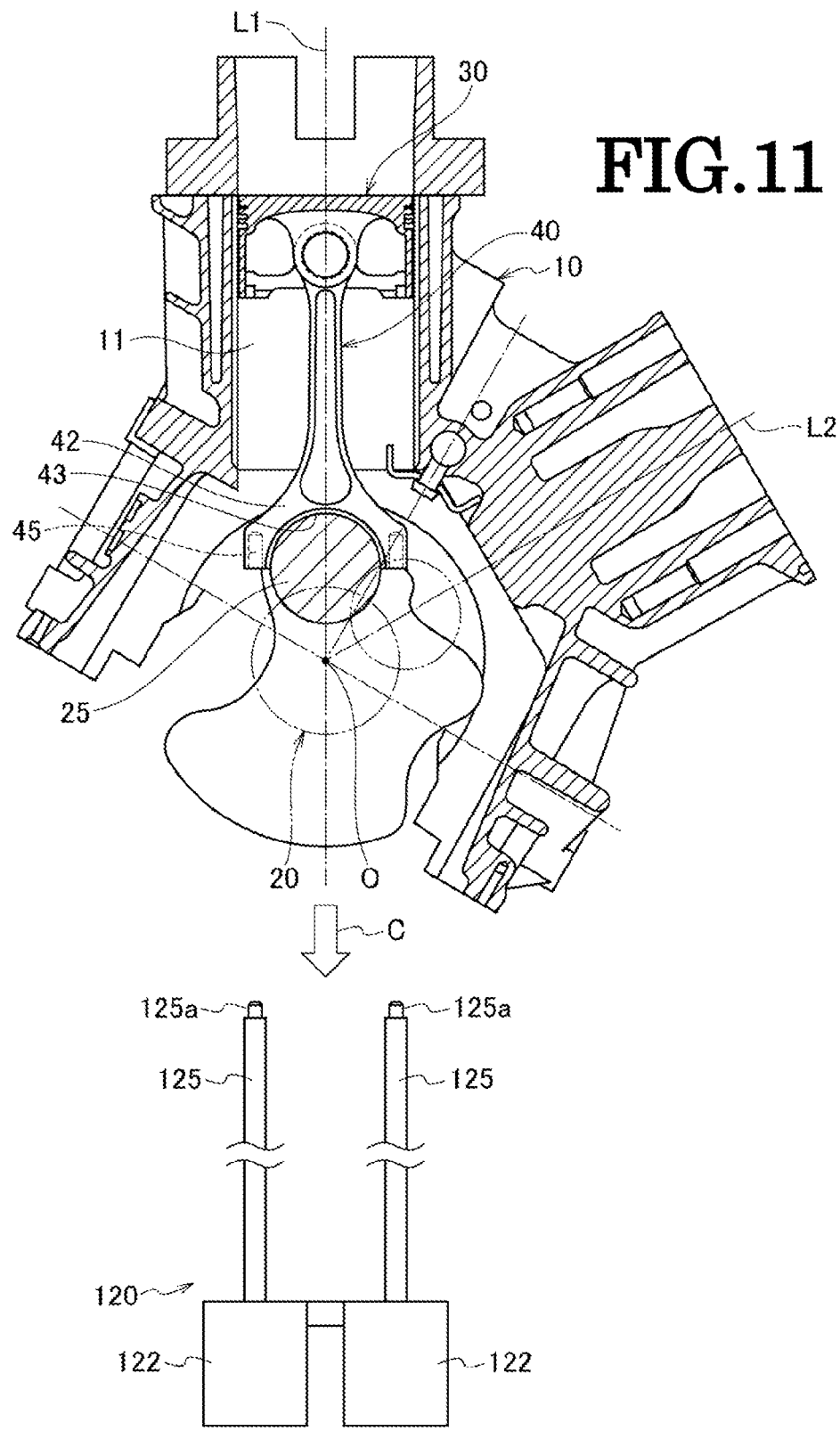
FIG. 11 is a sectional view illustrating a state in which the connecting rod guide is pulled out, and the guide rods move away from the cylinder bore, which is subsequent to the state illustrated in FIG. 10.

After the piston 30 is completely pulled in, the guide rod engaging portion 122 releases the engagement between the connecting rod 40 and the guide rods 125. As illustrated in FIG. 11, the guide rod drive portion 126 (Refer to FIG. 5.) moves the guide rods 125 away from the cylinder bore 11 as illustrated by arrow C.

Figure 12:
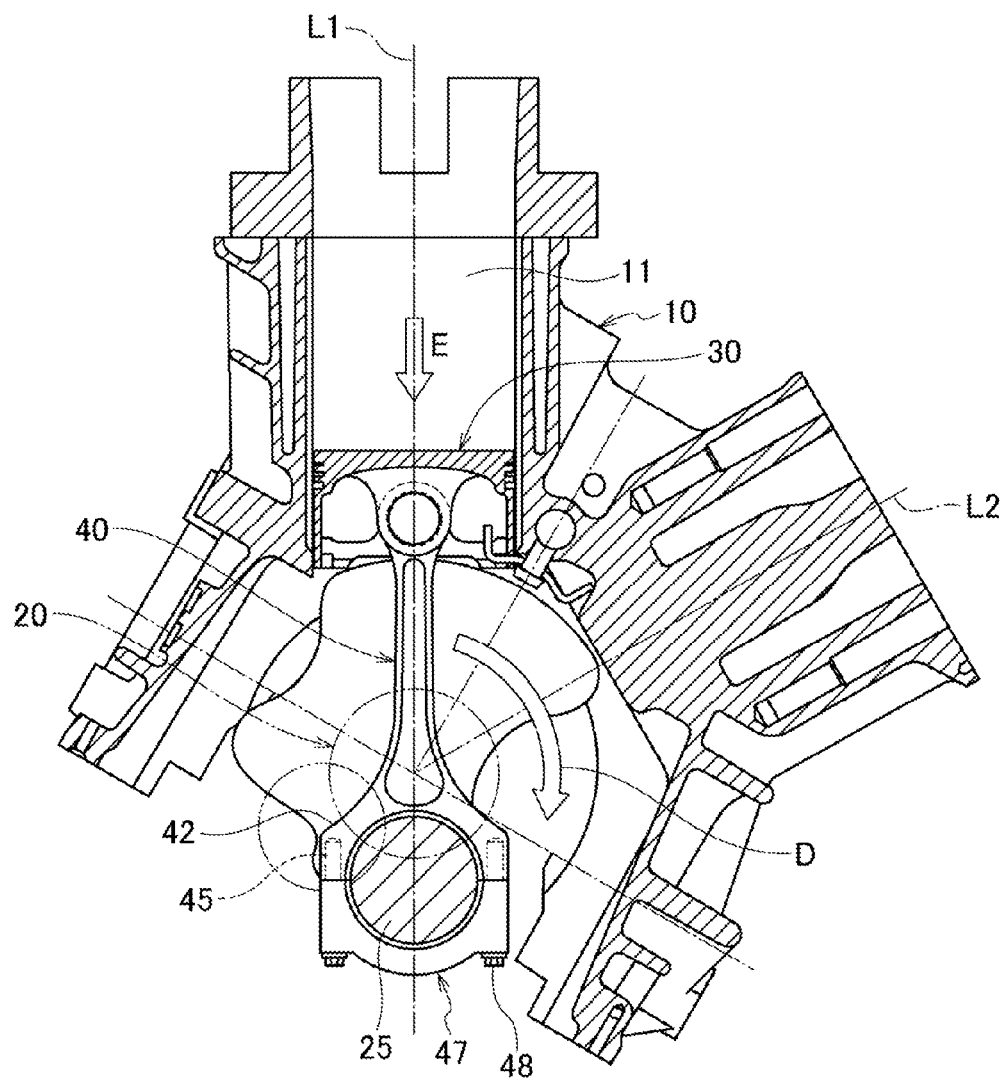
FIG. 12 is a sectional view illustrating a state in which the crank pin indexes from the top dead center to a bottom dead center in a state where the semi-circular arc-shaped end portion of the connecting rod is fitted to the crank pin, and a connecting rod cap is joined to the semi-circular arc-shaped end portion of the connecting rod, which is subsequent to the state illustrated in FIG. 11.

Subsequently, as illustrated in FIG. 12, the crankshaft 20 rotates as illustrated by arrow D, and the crankpin 25 indexes to the bottom dead center. At this time, the air cylinder 171 operates such that the push-in tool 172 (Refer to FIG. 1.) of the push-in device 170 simultaneously moves the piston 30 and the connecting rod 40 as illustrated by arrow E.

After the crankpin 25 is positioned at the bottom dead center, the cap supply unit 180 extends the air cylinder 181 such that the connecting rod cap 47 held by the cap holding portion 182 is supplied to the connecting rod cap tightening portion 150. The connecting rod cap tightening portion 150 tightens the connecting rod cap 47 to the semi-circular arc-shaped end portion 42 of the connecting rod 40 using the bolts 48, and the assembly of the pistons 30 into the cylinder bores 11 of the cylinders #1 and #5 is completed.

Depending on the type of the engine, even after the piston is completely pulled, the piston 30 and the connecting rod 40 may move to the bottom dead center using the guide rods 125 instead of the push-in device 170, and then the guide rods 125 may move away from the cylinder bore 11. Alternatively, after the piston 30 is completely pulled, the connecting rod cap 47 may be tightened to the semi-circular arc-shaped, end portion 42 of the connecting rod 40 without rotating the crankshaft 20 when the guide rods 125 move away from the cylinder bore 11 to the position illustrated in FIG. 11. In addition, in a state where the crankshaft 20 is positioned at the bottom dead center, the piston 30 may be pulled, and then the connecting rod cap 47 may be tightened to the semi-circular arc-shaped end portion 42 using bolts without rotating the crankshaft 20.

Subsequently, the crankpins 25, which correspond to the cylinder bores 11 of the cylinders #2 and #6 that are at the same phase, are positioned at the top dead centers by rotating the crankshaft 20, and then similarly, the pistons 30 are assembled into the cylinder bores 11 of the cylinders #2 and #6. The crankpins 25, which correspond to the cylinder bores 11 of the cylinders #3 and #4 that are at the same phase, are positioned at the top dead centers, and similarly, the pistons 30 are assembled into the cylinder bores 11 of the cylinders #3 and #4. When an operation of simultaneously assembling the pistons 30 into the pair of the cylinder bores 11 which is at the same phase is repeated in three cycles, the assembly of the pistons 30 to the cylinder block 10 is completed.

As described above, according to the assembly method and the assembly apparatus in the embodiment, the diameters of the tip end portion 125a of each of the guide rods 125 is increased in the female screw hole 45 of the semi-circular arc-shaped end portion 42 of the connecting rod 40, and thus the connecting rod 40 is engaged with the guide rods 125, and the connecting rod 40 and the piston 30 are pulled into the cylinder bore 11. Since the guide rods 125 pull the connecting rod 40 and the piston 30 while guiding the connecting rod 40 and the piston 30, a push-in device in the related art is not required, it is not necessary to push the piston 30 inward synchronously with the movement of the guide rods 125, and it is possible to assemble the piston using simple means. Since the connecting rod 40 can be inserted into the cylinder bore 11 in a state where the connecting rod 40 is engaged with the guide rods 125, it is possible to achieve high-quality assembly of the piston 30 using a simple configuration without damaging the end surface 44 of the semi-circular arc-shaped end portion 42 of the connecting rod 40, or an inner wall of the cylinder bore 11.

The guide rod engaging portion 122 in the embodiment can be used for not only the bag-like female screw hole 45 but also a female screw through hole, and can engage the connecting rod 40 with the guide rod 125 regardless of the shape of the hole of the semi-circular arc-shaped end portion 42 of the connecting rod 40.

In the guide rod engaging portion 122 according to the embodiment, the outer circumferential surface of the collet 127 is friction-gripped by the circular cylindrical surface 45b which is positioned closer to the opening than the female screw portion 45a; however, the female screw portion 45a instead of the circular cylindrical surface 45b may be gripped, and in this case, the shape of the outer circumferential surface of the collet 127 may be changed to the shape of the female screw portion 45a.

In a case where the oil jet 50, which is assembled in advance, may interfere with the connecting rod 40 when the piston 30 is inserted into the cylinder bore 11, it is possible to insert the connecting rod 40 into the cylinder bore 11 while avoiding interference between the connecting rod 40 and the oil jet 50 by moving the connecting rod 40 in the axial direction of the crankshaft 20. Therefore, it is possible to assemble the piston 30 with the connecting rod 40 in a high quality manner while ensuring the degree of freedom in engine design regarding the installation of the oil jet 50.

Since it is possible to reciprocate the insertion jig 131 holding the piston 30 while changing the position of the piston supply unit 130 between the piston loading position SP and the piston insertion position WP, it is possible to improve the degree of freedom in the layout of parts of the assembly apparatus, and to simply design a mechanism such as the piston transport robot 160.

The piston transport robot 160, which loads the piston 30 onto the insertion jig 131, has multiple gripping claws 162 which grip the piston rings 32 while pressing the piston rings 32 inward in the radial direction, and the insertion jig 131 has the cut-away portion 133 such that the insertion jig 131 is prevented from interfering with the gripping claws 162. Therefore, it is possible to load the piston 30 onto the insertion jig 131 without damaging the piston rings 32, and it is possible to assemble the piston 30 with the connecting rod while maintaining the quality of the piston rings 32.

Since the cap supply unit 180 supplies the connecting rod cap 47 to a gap between the connecting rod cap tightening portion 150 and the semi-circular arc-shaped end portion 42 of the connecting rod 40 which sits on the crankpin 25 of the crankshaft 20, it is possible to supply the connecting rod cap 47 by simple motions such as a straight motion, and to easily perform a tightening operation, and it is possible to simplify the connecting rod cap tightening portion 150.

In the embodiment, the cylinder block 10 is held while being turned upside down, and the piston 30 with the connecting rod 40 is assembled into the cylinder bore 11 diagonally from the lower side to the upper side in the vertical direction; however, the cylinder head mounting side opening 11a of the cylinder bore 11 may be disposed to face upward, and the pistons 30 with the connecting rods 40 may be diagonally inserted into the cylinder bores 11 (for which the crankpins 25 are positioned at the same phase) from the upper sides to the lower sides in the vertical direction.

Also in an in-series 4-cylinder engine in which two cylinders with an angle of 180° therebetween are simultaneously present at top dead centers, the pistons can be simultaneously inserted into the cylinder bores for which the crankpins 25 are present at the same position.

The present invention is not limited to the aforementioned embodiment, and modifications, improvement, or the like can be made to the present invention.

Figure 15A:
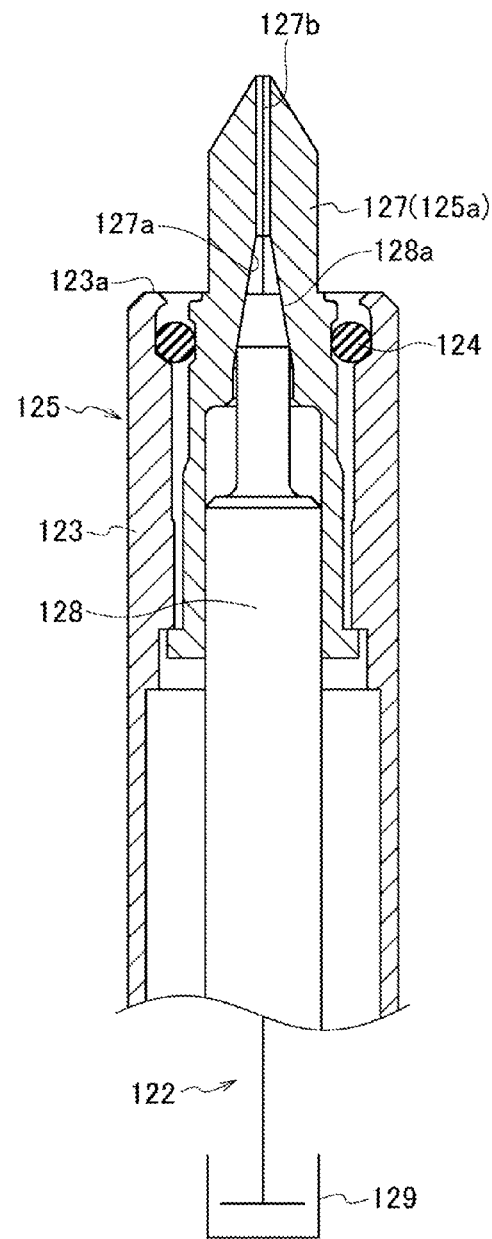
FIG. 15A is a sectional view illustrating main parts of a guide rod in a modification example before the diameter of a tip end portion of the guide rod is increased.
Figure 15B:
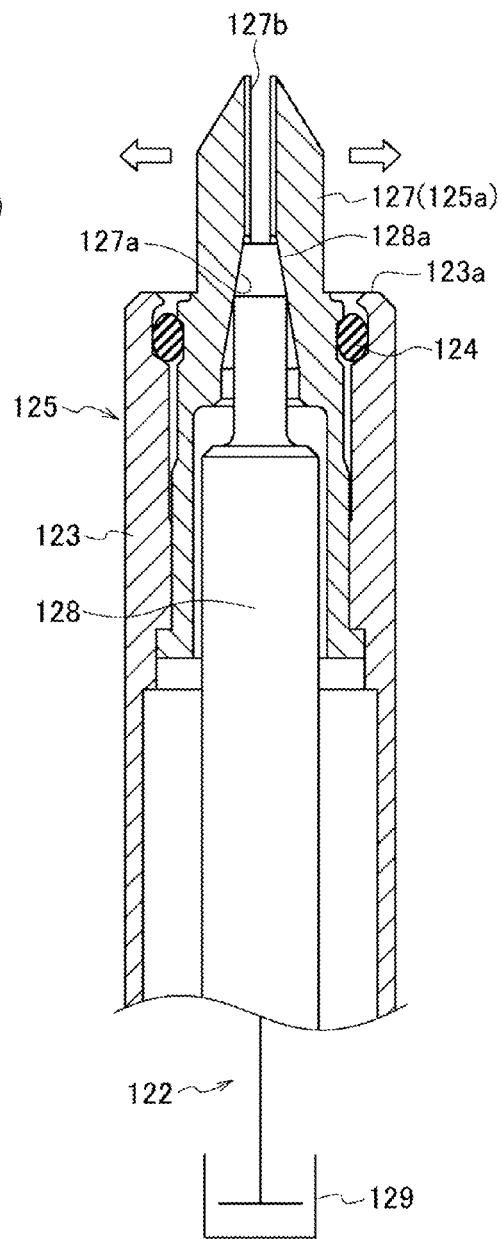
FIG. 15B is a sectional view illustrating the main parts after the diameter of the tip end portion of the guide rod is increased.

For example, in the guide rod 125 according to the embodiment, the tip end of the collet pusher 128 is configured as the spherical surface 128b; however, as illustrated in FIG. 15, the tip end of the collet pusher 128 may be configured as an inclined surface 128a which resembles the tapered surface 127a. Since the tip end of the collet pusher 128 is configured as the inclined surface 128a that has the same incline angle as that of the tapered surface 127a of the collet 127, when the air cylinder 129 pushes the collet pusher 128 inward, a contact area between the tapered surface 127a and the inclined surface 128a is increased, and it is possible to improve durability.

It is possible to dispose the crankshaft turning portion at an arbitrary position in existing equipment.

The present invention is based, on Japanese Patent Application No. 2013-5698 filed on Jan. 16, 2013 and Japanese Patent Application No. 2013-148320 filed on Jul. 17, 2013, and the content of each of which is incorporated hereinto for reference.

DESCRIPTION OF REFERENCE NUMERALS 10 cylinder block
11 cylinder bore
11a cylinder head mounting side opening
11b opening adjacent to crank chamber
20 crankshaft
25 crankpin
30 piston
32 piston ring
40 connecting rod
42 semi-circular arc-shaped end portion
45 female screw hole (hole)
47 connecting rod cap
50 oil jet
100 assembly apparatus
110 cylinder block positioning portion
122 guide rod engaging portion
125 guide rod
125a tip end portion
126 guide rod drive portion
127 collet
127a tapered surface
127b slit
128 collet pusher
128a inclined surface
128b spherical surface
130 piston supply unit
131 insertion jig
133 cut-away portion
150 connecting rod cap tightening portion
160 piston transport robot
162 gripping claw
180 cap supply unit
SP piston loading position
WP piston insertion position

The invention claimed is:

1. A piston assembly apparatus which inserts a piston assembled with a connecting rod into a cylinder bore of a cylinder block to which a crankshaft is assembled, and tightens a connecting rod cap to the connecting rod such that the piston is connected to the crankshaft, comprising:
   a cylinder block positioning portion for positioning the cylinder block to which the crankshaft is assembled at a predetermined position;
   a crankshaft turning portion for turning the crankshaft, and indexing a turning angle of the crankshaft;
   guide rods, each of which has a tip end portion which has an expandable diameter, and the guide rods being insertable each into one of a pair of holes formed in a semi-circular arc-shaped end portion of the connecting rod to restrict an oscillation of the connecting rod and the piston when the guide rods are inserted into the pair of holes;
   a guide rod engaging portion for engaging the connecting rod with the guide rods by increasing a diameter of the tip end portion of each of the guide rods when the guide rods are inserted in the pair of holes of the semi-circular arc-shaped end portion of the connecting rod;
   a guide rod drive portion for inserting the guide rods into the cylinder bore via an opening of the cylinder bore, which is positioned adjacent to a crank chamber of the cylinder bore, and pulling the inserted guide rods which are engaged with the connecting rod from the cylinder bore to pull the piston assembled with the connecting rod into the cylinder bore; and
   a connecting rod cap coupling portion for coupling the connecting rod cap to the semi-circular arc-shaped end portion of the connecting rod which sits on a crankpin of the crankshaft such that the piston is connected to the crankshaft through the connecting rod.

2. The piston assembly apparatus according to claim 1, further comprising:
   a piston supply unit which includes an insertion jig which can hold the piston assembled with the connecting rod, and which is able to reciprocate the insertion jig between a piston loading position where the piston is loaded onto the insertion jig and a piston insertion position where the piston held by the insertion jig is inserted into the cylinder bore via a cylinder head mounting side opening.

3. The piston assembly apparatus according to claim 2, further comprising:
   a piston transport robot which has at least three gripping claws for pressing piston rings of the piston inward in a radial direction to grip the piston rings of the piston, and which transports the piston to load the piston onto the insertion jig,
   wherein the insertion jig has a cut-away portion for preventing interference between the insertion jig and the gripping claws when the piston is loaded.

4. The piston assembly apparatus according to claim 1, further comprising:
 a cap supply unit which supplies the connecting rod cap to a gap between the connecting rod cap coupling portion and the semi-circular arc-shaped end portion of the connecting rod which sits on the crankpin of the crankshaft.

5. The piston assembly apparatus according to claim 1,
 wherein the guide rod engaging portion includes a collet forming the tip end portion of the guide rod which is divided into multiple pieces by a slit axially formed, and a collet pusher increasing the diameter of the tip end portion by pressing a tapered surface in the collet, and
 wherein a tip end of the collet pusher is an inclined surface which resembles the tapered surface.

* * * * *